Aug. 20, 1957 W. F. NOLDEN ET AL 2,803,716
KEY-OPERATED ROTARY SELECTOR SWITCHES
Filed Sept. 24, 1956 4 Sheets-Sheet 1
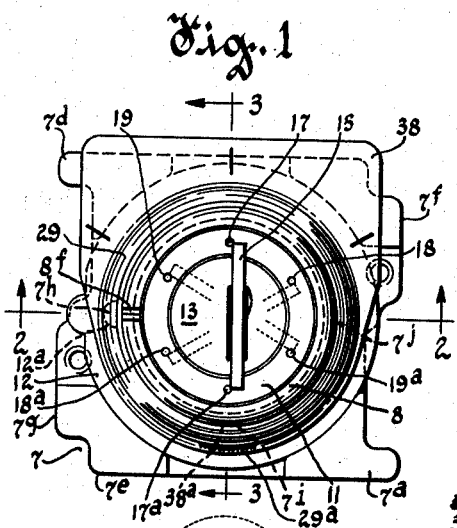
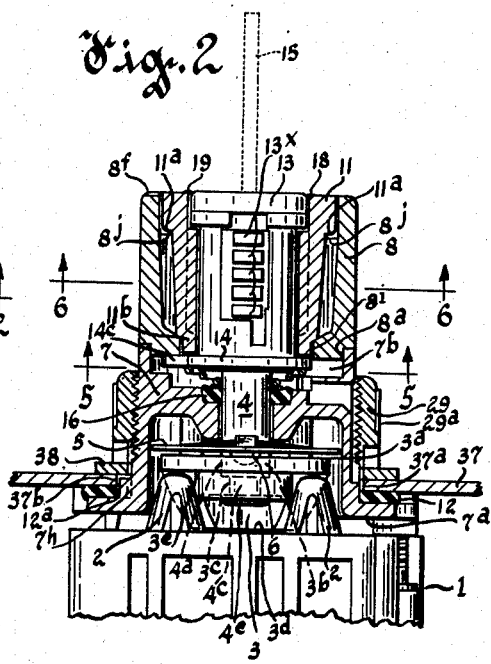
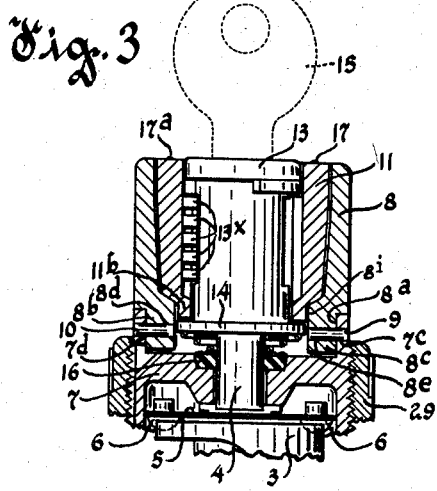
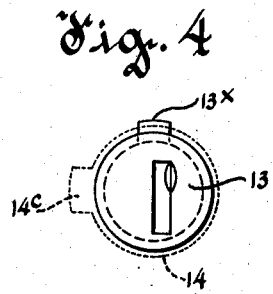
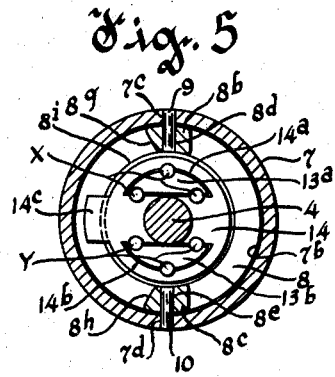
Inventors.
William F. Nolden.
Clyde F. Robbins.
By W. E. Lyon
Attorney

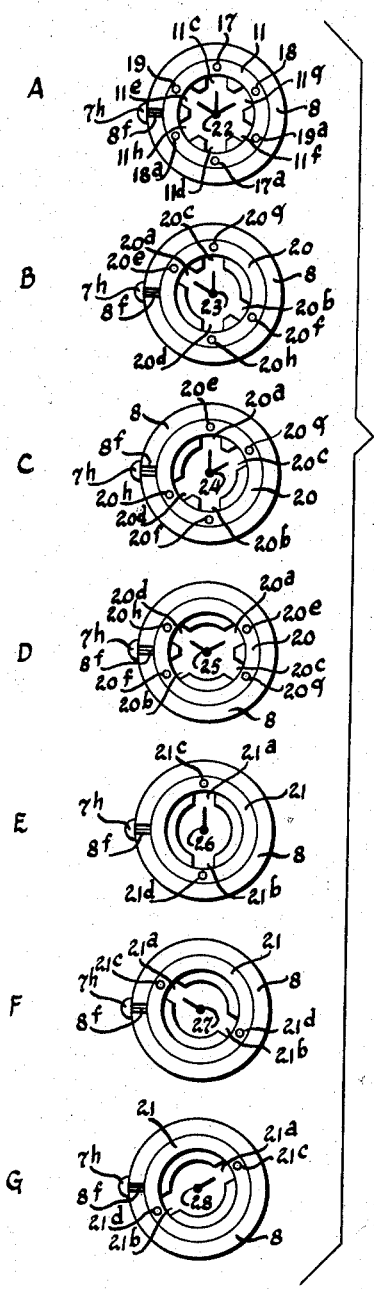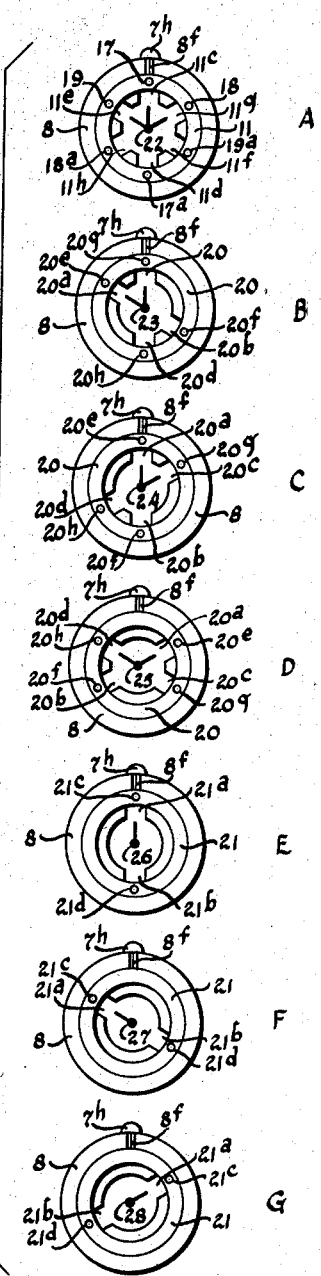

Aug. 20, 1957 W. F. NOLDEN ET AL 2,803,716
KEY-OPERATED ROTARY SELECTOR SWITCHES
Filed Sept. 24, 1956 4 Sheets-Sheet 3

Inventors.
William F. Nolden.
Clyde F. Robbins.
By W. E. Lyon
Attorney

Aug. 20, 1957 W. F. NOLDEN ET AL 2,803,716
KEY-OPERATED ROTARY SELECTOR SWITCHES
Filed Sept. 24, 1956 4 Sheets-Sheet 4
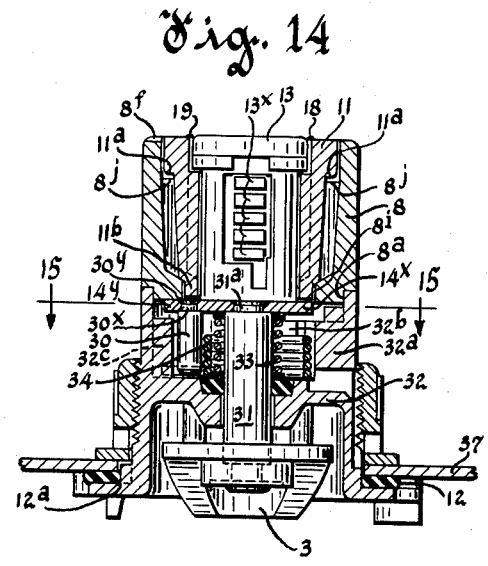
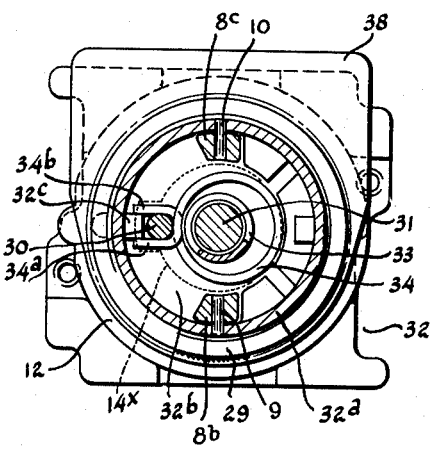
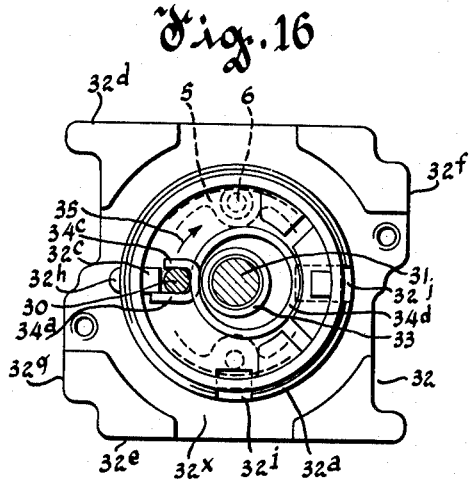
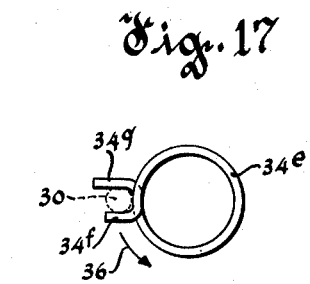
Inventors.
William F. Nolden.
Clyde F. Robbins.
By W. E. Lyon
Attorney United States Patent Office 2,803,716
Patented Aug. 20, 1957

2,803,716

KEY-OPERATED ROTARY SELECTOR SWITCHES

William F. Nolden and Clyde F. Robbins, Milwaukee, Wis., assignors to Cutler-Hammer, Inc., Milwaukee, Wis., a corporation of Delaware Application September 24, 1956, Serial No. 611,579

16 Claims. (Cl. 200—44)

This invention relates to improvements in key-operated rotary selector switches; and the invention relates more particularly to oil-tight switches of the aforementioned type.

A primary object of the invention is to provide a novel form of such switches, which are of unusually rugged and long-life construction; and hence are not likely to get out of order when in use.

Another object is to provide such switches of either the two-position type, or the three-position type, with a minimum number of different parts for both types.

Another object is to provide such key-operated rotary selector switches adapted for manual key operation to and from a plurality of circuit-controlling positions, or alternatively providing for automatic spring-return of the key and the parts controlled thereby to a given position thereof upon release of the key after manual rotary movement thereof to one or more other operative positions of the same.

Another object is to provide means adapting all parts of such switches for mounting thereof within a minimum space requirement when mounted in vertical rows; or, alternatively, when mounted in horizontal rows.

Another object is to provide a novel combination of elements including a tumbler type lock, having a rotatable locking barrel; a bearing for the latter; a retainer for said bearing, and a supporting base member to which said parts are attached.

Another object is to provide any one of a number of different cam members of suitable form which cam member is rigidly and permanently attached to said rotatable barrel, for control of one or more switch mechanisms of known form, as hereinafter set forth.

Another object is to provide a device of the character aforementioned wherein the bearing member, the supporting base, and the lock may each be assembled relatively to the other in any one of a number of different rotary relationships, for purposes hereinafter set forth.

Another object is to provide a rotary cam type, key-operated selector mechanism which is particularly adapted for use with a known form of single or multiple switch mechanisms, according to the particular circuit control required or desired.

Another object is to provide for use of any one of three slightly different bearing members within the bearing retainer, to provide for removal of the key in either one, two or three of the rotary positions of the latter; while insuring locking of the lock, and the parts carried thereby, upon removal of said key.

Other objects and advantages of the invention will hereinafter appear.

The accompanying drawings illustrate certain embodiments of the invention which will now be described; it being understood that the embodiments illustrated are susceptible of modification in respect of certain structural details thereof without departing from the spirit of our invention or the scope of the appended claims.

In the drawings,

Figure 1 is a top plan view, drawn to one and one-half times normal scale, of a three-position, key-operated rotary switching device constructed in accordance with our invention; when constructed for mounting with a minimum vertical space requirement, as shown; the key being shown in full lines in its intermediate rotary position, and in dotted lines in each of its two end positions.

Fig. 2 is a longitudinal sectional view, on the line 2—2 of Fig. 1; the key being illustrated in phantom; the molded insulating housing for a pair of switches; the pair of like plungers for switches of the normally-open type, and the rotatable cam member being shown in side elevation as of a type to provide for selective closure of one or the other of the switches, upon a predetermined degree of rotation of said cam in opposite directions, respectively, from the position thereof illustrated.

Fig. 3 is a fragmentary, center line, longitudinal section, on the line 3—3 of Fig. 1; but illustrating in full lines the locking positions of the respective plungers with respect to the bearing member when the key is removed; the outer end portion of the key being merely illustrated in phantom.

Fig. 4 is a top plan view of the locking barrel, for a switch of the type arranged for such minimum vertical space requirement when mounted with other generally similar switches in horizontal rows; the washer underlying the locking barrel, as shown in full lines in Figs. 2 and 3, being indicated by dotted lines in this figure.

Fig. 5 is a transverse section, on the line 5—5 of Fig. 2, looking in the direction of the arrows.

Figure 10:
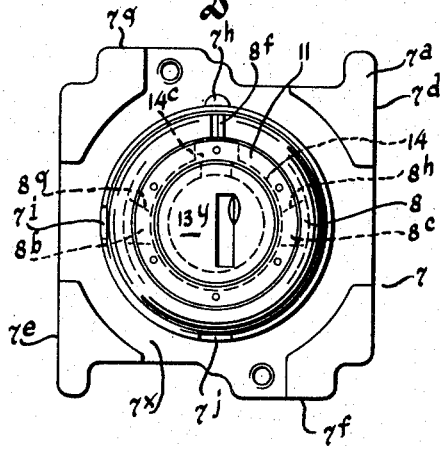

Fig. 10 is a top plan view of an assembly of various parts, including the cast metal adapter member arranged for a minimum horizontal space requirement when a plurality of the switching devices are to be arranged in a vertical row or rows, the sealing gasket, indicating plate and mounting or clamping ring being omitted, for clarity of illustration; and the key-controlled locking plungers, the throw-limiting plate, and the integral stop lugs at the lower end of the cast metal housing for the lock parts being shown in dotted outline.

Figure 11:
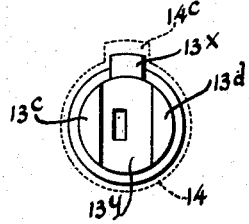

Fig. 11 is a bottom plan view of a modified form of lock barrel assembly, to provide a minimum horizontal space requirement of a group of switches to be mounted in vertical rows, as indicated in Fig. 10, with the metal stop plate merely shown in dotted outline.

Fig. 12 is a somewhat diagrammatic illustration of a group of seven functionally different types of key-controlled switch operating mechanisms, each mechanism being shown as arranged for a minimum vertical space requirement thereof when the same are mounted in horizontal rows, as hereinafter described.

Fig. 13 is a similar diagrammatic illustration of a group of seven functionally different types of key-con trolled switching operating mechanisms, each mechanism being shown as arranged for a minimum horizontal space requirement thereof when the same are mounted in vertical rows, as hereinafter described.

Fig. 14 is a longitudinal sectional view, similar to Fig. 2, but showing a modified form of cast metal adapter member having a relatively deeper central circular recess to accommodate a centrally located coiled compression spring, to insure proper longitudinal positioning of the various parts when assembled; and an eccentrically positioned coiled torsion spring surrounding the aforementioned compression spring; said torsion spring, when used as shown in Figs. 14 and 15, being arranged to effect automatic return of the switch operating mechanism to its intermediate position upon manual release of the key after rotation thereof in either direction.

Fig. 15 is a transverse section, on the broken line 15—15 of Fig. 14, looking in the direction of the arrows.

Fig. 16 is a transverse sectional view, similar to Fig. 15, but in slightly different planes, of a modification which provides for automatic return of the key, and the parts movable therewith to the normal positions thereof, after clockwise movement of the key and subsequent manual release thereof; the parts being free of said spring when the key is inserted and rotated from the intermediate position thereof in a counterclockwise direction to an extreme position thereof; and Fig. 17 is a fragmentary illustration, similar to Fig. 16, but showing a coiled torsion spring with the relatively long straight end arm at the lower end of the spring and the relatively short straight end arm at the upper end thereof, whereby the key-operated locking barrel, when rotated in a clockwise direction from a predetermined normal position thereof, will be returned automatically to said normal position thereof, by said spring, upon manual release of the key; the parts being free of said spring when the key is inserted and rotated from the intermediate position thereof in a clockwise direction to an extreme position thereof.

Referring first to Fig. 2 of the drawings, it is to be understood that the two-part molded insulating housing, shown at 1 in said figure, may be, and preferably is, identical with the housing or housings disclosed in our prior application, Serial No. 574,828, filed March 29, 1956, for Improvements in Electric Switches. Similarly the bridging contactor actuating plungers, shown at 2, 2 in Fig. 2, are for switches of the normally open type; although, as pointed out in said application, Serial No. 574,828, both of the plungers employed may be for switches of the normally closed type, or one plunger of each type (with correspondingly different types of bridging contactors) may be assembled within the molded insulating housing 1, with proper pairs of stationary contacts; or within a desired number of said housings, connected one behind another; as fully described in our aforementioned application, Serial No. 574,828.

We have illustrated herein only one specific form of cam 3, which is permanently and non-rotatably attached to a shaft 4 (Figs. 2, 3 and 5) or to a relatively longer shaft 31 (Figs. 14, 15 and 16); either with suitable indexing elements 5 and 6, for cooperation with the properly formed adjacent surface of cam 3, when the operating mechanism is of the non-spring return type shown in Figs. 2 and 3; or with the indexing elements 5 and 6 omitted when the operating mechanism is of the spring-return type from one or two positions to which it may be operated as shown in Figs. 14 to 17, inclusive. It is to be understood, however, that any one of the various different forms of cams, such as those disclosed in our prior application, Serial No. 601,810, filed August 2, 1956, for Manually Operated Rotary Selector Switches, may be employed, where necessary or desirable, for performance of different circuit controlling functions.

Referring now to the several forms of our invention shown in Figs. 1 to 13, inclusive; it is to be understood that one or more switch housings 1, having two normally open type switch mechanisms therein, as shown in Fig. 2; or, alternatively either two normally closed type switch mechanisms, or one switch of each type, may be attached to the lower surface of the flange portion 7$^a$ of a die-cast metal support member 7, of the form best illustrated in Figs. 2 and 3, in the manner set forth in our aforementioned application, Serial No. 574,828.

As shown in Figs. 2, 3 and 5, member 7 is provided in its outer end with a circular recess 7$^b$, the peripheral wall surface of which is adapted to accommodate, with a snug fit, the reduced circular lower end portion 8$^a$ of a second cast metal member 8, as shown in Fig. 2. Also, as shown in Figs. 3 and 5, said portion 8$^a$ of member 8 is provided, at approximately diametrically opposite points, with a pair of integral, downwardly extending lugs 8$^b$ and 8$^c$, of the cross sectional form illustrated in Fig. 5.

As shown in Figs. 3 and 5, the peripheral wall of recess 7$^b$ is provided at diametrically opposite points with a pair of relatively small openings 7$^c$ and 7$^d$ to slidably receive a pair of metal pins 9 and 10; and lugs 8$^b$ and 8$^c$ are respectively provided with alined openings 8$^d$ and 8$^e$ to accommodate with a press fit the inner ends of the respective pins 9 and 10; thus affording a fixed connection between cast metal members 7 and 8.

However, prior to thus connecting members 7 and 8, a cast metal member 11, of the form shown in detail in Figs. 1, 2, 3, 6, 7 and 11, is freely slidable into telescoped position within casting 8, and in flush relationship to the outer end of the latter, as shown in Figs. 2 and 3; the six inwardly facing segmental flange portions 11$^a$ (Fig. 2) each being adapted to seat against one pair of the outwardly facing segmental flange portions 8$^j$ formed on the casting 8.

Figure 6:
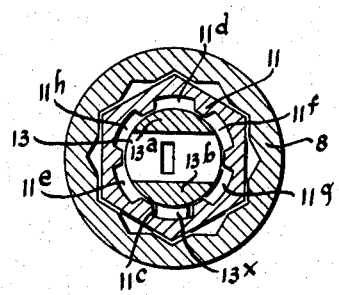
Fig. 6 is a transverse section, on the broken line 6—6 of Fig. 2, looking in the direction of the arrows; the locking barrel being in one locking position thereof, and the projections at the lower end thereof being shown in section.

As shown in Figs. 2, 3 and 6, casting 11 is of inwardly tapered hexagonal form in transverse cross section, between the inwardly facing flange portions 11$^a$ and the reduced, circular, lower end portion 11$^b$ thereof, which has a snug rotatable fit within the opening 8$^i$ formed in casting 8 at the inner end of the latter. Thus, as will be apparent from consideration of Fig. 6, casting 11 is insertable into casting 8 in any one of twelve assembled relationships thereto. The purpose of this duplication of inwardly tapered grooves in member 8 for cooperatively receiving the respective angular ribs or projections on member 11 is to provide for mounting one part within the other in various different relative rotary positions, and to provide for alternative mounting of one or more of the cast metal members 7, Fig. 2, so as to provide for a minimum vertical space requirement thereof when mounted in horizontal rows, it being understood that when a plurality of the devices are mounted side by side in the position thereof shown in Fig. 1, each of the left-hand lateral projections on the flange portion 7$^a$ of an assembly adjacent thereto on the right will be accommodated by the recessed form of the right-hand side edge of the unit to the left thereof. As will be noted in Fig. 1, the side edges 7$^d$ and 7$^e$ are parallel to each other.

It will be noted, upon consideration of Figs. 1, 2 and 10, that the cast metal member 7 may be identical, for all forms of the devices shown in Figs. 1 to 10; and as shown (in dotted lines in Fig. 1; and in full lines in Fig. 10) it is provided on the outer face of flange 7$^a$ with an integral indicating nib or projection 7$^h$, which is located at the left-hand side of the outwardly projecting cylindrical portion of said member 7 in Fig. 1. Said nib 7$^h$ also cooperates with a notch 12$^a$, formed in a rubber, or rubber-like, sealing gasket 12 to restrain the latter against rotation during and after attachment of the complete device to a perforated panel or the like.

As shown in Figs. 1, 2, and 10 the cast metal member 8 is provided with a radially extending narrow ridge or projection 8f, which is preferably plated, or otherwise provided with a coating of distinctive color, such as brass, copper or gold; and, as shown in said figures, when the various parts are completely assembled said ridge 8f will be located in the same radial plane as the aforementioned nib 7h on the cast metal member 7; thus insuring proper relationship of all of the parts when fully assembled, whether the complete devices are to be mounted in a relation to provide a minimum vertical space requirement thereof, as shown in Figs. 1 and 2, or a minimum horizontal space requirement thereof, as illustrated in Fig. 10.

Assuming that the parts are to be assembled to provide for a minimum vertical space requirement of a plurality of units when mounted in a vertical row or rows, as shown in Figs. 1 and 2, for example, after insertion of bearing member 11 into cast metal member 8 in the rotary relationship illustrated, and prior to attachment of casting 8 to casting 7; a key-operated, multiple-plunger, type of locking device 13 of suitable, known, form (with the key fully inserted thereinto) is freely insertable into member 11; it being understood that the locking barrel 13 is freely rotatable within bearing member 11, under such conditions, except for the means, now to be described, for limiting the degree of rotary movement of said locking barrel 13. Said means, as shown in Figs. 2, 3 and 5, comprises a flat, punched metal stop-plate 14, of the form best illustrated in Fig. 5. Thus the lower end portion of locking barrel 13 is provided with integral segmental portions 13a and 13b, spaced from each other; and plate 14 is provided with openings or perforations 14a and 14b to accommodate said portions 13a and 13b with a quite close fit; and said plate 14 is rigidly and permanently attached to member 13 by peening or upsetting against and over each other the adjacent edge portions of the walls of openings 14a and 14b and extensions 13a and 13b, as shown at the several points $x$ and $y$ in Fig. 5.

As shown in Figs. 2 and 5, plate 14 is provided with an integral stop lug 14c projecting from the left-hand side thereof, the opposite sides of which lug are selectively engageable with the abutment surfaces 8g and 8h formed on the downwardly extending portions 8b and 8c of casting 8 (Figs. 3 and 15). Thus if it be assumed that the key 15 is in its fully inserted position (shown in full lines in Fig. 1 and in dotted lines in Fig. 2), all of the five locking plungers 13x (Fig. 2) will be retracted to unlocking position; whereas, if key 15 is entirely withdrawn from locking device 13, the various plungers 13x will move automatically into locking position, as shown in Fig. 6, to positively prevent rotary movement of device 13 pending reinsertion and rotation of key 15. Thus it will be understood that in Fig. 2 the key 15 has actually been removed, to provide for locking action of the plungers, one of which is shown at 13x in Fig. 6.

Figure 7:
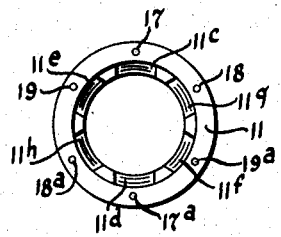
Fig. 7 is a top plan view of a cast metal bearing member; the inner periphery of the same being formed to permit removal of the key in any one of three different rotary positions of the locking barrel.

Upon consideration of Fig. 1 in conjunction with Fig. 7, it will be noted that member 11, when employed, provides for locking of the switch operating mechanism in either its intermediate position, shown in Fig. 1, or in either of its two rotary extreme positions, upon complete removal of key 15 in each instance.

As aforestated, and as shown in Figs. 2, 3 and 5, the limit-stop plate 14 has rigidly and permanently attached thereto, as by riveting or welding, and extending downwardly from the lower surface thereof, a metal shaft or stud member 4, preferably of circular form in transverse cross section, the integral wall or diaphragm portion of casting 7 having a central circular opening therethrough to provide rotary clearance for shaft 4; the outer surface of said wall having a recess therein of relatively larger diameter, and of preselected depth, to accommodate a rubber, or rubber-like, sealing gasket 16, between which and stop plate 14 a coiled compression spring, wound into the form of an inverted frustum of a cone, is interposed, to resiliently bias the various rotatable parts of the assembly to proper positions relatively to the castings 7 and 8, upon attachment of the latter to each other.

Thus, as best illustrated in Figs. 2, 3 and 5, upon rigid attachment of plate 14 to the lower end of locking barrel 13 the bearing member 11 will be positively restrained against rotary displacement with respect to casting 8; and the parts 11, 13 and 14 will likewise be positively restrained against any substantial degree of endwise displacement relatively to each other, and with respect to casting 8. Similarly, the aforementioned pins 9 and 10, which have a force fit within the respective openings 8d and 8e in the abutment portions 8b and 8c of casting 8, positively retain the castings 7 and 8 in fixed relationship to each other.

In respect of key-operated rotary selector switches of the character herein disclosed, it is to be understood that any one of a large number of different forms of molded insulating operating cams may be interposed between the key-operated rotary selector mechanism; and one, two, or a much larger number, of bridging contactor carrying, and/or controlling, plungers for switches, of either, or both, the normally open or normally closed types of switches, may be attached to and supported by the flange portion 7a of casting 7; cams of such different types being disclosed and claimed in our prior application, Serial No. 601,810, filed July 31, 1956, for Manually Operated Rotary Selector Switches. Also it is to be understood that the switch mechanisms, indicated at 1 in Fig. 2 herein; including the plungers 2, 2, and various structural details of the switch-supporting and mounting means, are preferably of the character disclosed and claimed in our prior application, Serial No. 574,828, filed March 29, 1956, for Improvements in Electric Switches. However, it will be apparent to those skilled in the art that various other forms of plunger-controlled switch mechanisms might be employed; while retaining many of the structural and operative characteristics of the invention herein disclosed.

Thus assuming use of the specific form of cam 3, shown in side elevation in Fig. 2, and fragmentarily in side elevation in Fig. 3, it is to be understood that said cam is provided in its upper surface 3a (Fig. 2) with a non-circular recess 3b, having at least two parallel sides (as disclosed in our said prior application, Serial No. 601,810), to non-rotatably receive the parallel-sided reduced portion 4a of shaft 4; as shown in Fig. 2. Cam 3 is further provided with an opening or passage 3c of circular form, in axial alinement with said recess 3b, to accommodate the further reduced, circular, lower end portion 4c of shaft 4; and the projecting lower end portion of said shaft is spun over, or peened, as indicated at 4e, to permanently and non-rotatably connect said parts to each other.

Here, as in our prior application, Serial No. 601,810, the resilient metal member 5 is provided with one or more hemispherical headed members for cooperative engagement with correspondingly shaped recesses in the otherwise flat upper surface 3a of cam 3.

Assuming that a pair of circuit controlling switches, represented at 1 and 2, 2, in Fig. 2 have been attached to the bottom flange portion 7a (as by means of a pair of fillister-headed screws), as shown in our aforementioned application, Serial No. 574,828; or that additional pairs of switches are attached to the switch casing 1 and to each other by such fillister-head screws; it will be apparent that upon clockwise rotation of key 15 from its intermediate "off" position through an angle of sixty degrees, the right-hand portion of cam 3a will cause depression of the right-hand plunger 2, to effect bridging engagement of the contactor controlled thereby with its associated pair of stationary contacts, at which time the flat lower surface portion 3d of cam 3 will overlie said right-hand plunger 2 to maintain closure of the contacts controlled thereby. During such operation of cam 3, the flat, downwardly facing, surface 3ᵉ will continue to overlie the left-hand plunger 2, so that the circuit controlled thereby will be unaffected. Inasmuch as a bearing member 11 is employed in the showing of Fig. 2, see also Figs. 6 and 7, it is to be understood that upon removal of key 15 the various parts of the mechanism will be locked in the respective positions to which they were moved, upon removal of said key, and pending full reinsertion and rotation of the key 15 to its intermediate position or to its other extreme position. Also, as shown in Figs. 1, 3 and 7, the bearing member 11 is provided with three diametrically opposed pairs of small raised portions or pips 17, 17ᵃ; 18, 18ᵃ and 19, 19ᵃ, all of which have a plating or coating of a color contrasting with the color of member 11; which raised portions serve to indicate the positions of the key in which it is removable; whereas upon removal of the key from one of such positions, the selective "on" or "off" condition of the circuit or circuits controlled thereby will be retained pending reinsertion and rotation of the key and the parts operated thereby to another position. The means thus providing for removability of the key in each of its three rotary positions consists of the three pairs of diametrically opposite vertical grooves 11ᶜ, 11ᵈ; 11ᵉ, 11ᶠ, and 11ᵍ, 11ʰ, each shown in Fig. 7, and in Fig. 6.

Figure 8:
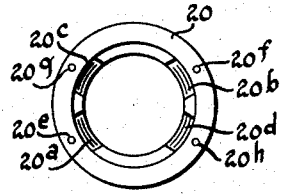
Fig. 8 is a top plan view of a modified form of bearing member, which permits removal of the key from the locking barrel in each of two rotary positions of the latter; but prevents removal of the key in the third rotary position thereof.

In the modified form of bearing member 20 illustrated in Fig. 8 only two pairs of diametrically opposite vertical grooves 20ᵃ, 20ᵇ and 20ᶜ, 20ᵈ are provided; with corresponding pairs of small raised portions 20ᵉ, 20ᶠ, and 20ᵍ, 20ʰ, to indicate key removal positions.

Figure 9:
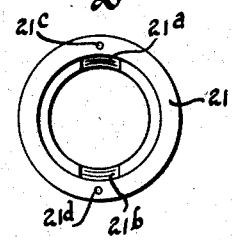
Fig. 9 is a top plan view of a further modified form of bearing member; which is so formed internally as to insure against removal of the key in two of the three rotary positions thereof when positioned within the locking barrel, while permitting removal of the key in the third rotary position thereof.

In the further modified form of bearing member 21 illustrated in Fig. 9 only one pair of diametrically opposite vertical grooves 21ᵃ and 21ᵇ is provided; with a corresponding pair of small raised portions 21ᶜ and 21ᵈ to indicate the only possible relative rotary positions of the locking barrel 13 within the bearing member 21 in which the key 15 may be removed; it being understood, of course, that the locking barrel 21, with the key fully inserted may be freely inserted into bearing member 21, and thereafter retained in assembled relationship thereto upon attachment to the lower end of said barrel of the stop plate 14 aforementioned.

Upon comparison of the showing in Figs. 4 and 5; which illustrates the relationship of the stop plate 14 to the locking barrel 13 when the bottom flange 7ᵃ of casting 7 is mounted to a perforated panel or the like in a manner to minimize the vertical space requirement of two or more of the devices when mounted in a vertical line; with the locking barrel 13ʸ shown in Figs. 10 and 11 wherein (Fig. 10) the flange 7 is to be mounted, in a manner requiring a minimum amount of space in a horizontal direction, it will be noted that the stop plate 14, shown in dotted lines in Figs. 10 and 11, is identical with that shown in Figs. 3, 4 and 5, but is displaced in a clockwise direction through a rotary angle of ninety degrees. For this purpose, the cast lower end portion of the modified form of locking barrel 13ʸ has a pair of integral downward projections 13ᶜ and 13ᵈ which are displaced clockwise through a rotary angle of ninety degrees from the relative positions of the like projections 13ᵃ and 13ᵇ shown in Fig. 5; thus bringing the locking plungers 13ˣ into alinement with the stop lug 14ᶜ of stop plate 14, as illustrated in Figs. 10 and 11.

Fig. 12 illustrates seven possible arrangements of the various parts of three-position, key-operated, rotary selector switches, when mounted as shown in Fig. 1, for a minimum horizontal space requirement of the flange portion 7ᵃ of cast metal member 7, the respective illustrations being designated by the letters A, B, C, D, E, F, and G. Thus the showing "A" in Fig. 12, illustrates the use of a bearing member 11 which permits removal of the key when the locking barrel is in its intermediate rotary position, or in either of its two extreme circuit controlling positions, as indicated by the three radial lines at 22.

The showing 12B illustrates such a three-position switch wherein the key is removable when the locking barrel is in either its intermediate position or its left-hand extreme position, as indicated by the two radial lines at 23, but is not removable when the locking barrel is in its right-hand extreme position.

Conversely, the showing 12C illustrates such a switch wherein the key is removable when the locking barrel is in either its intermediate position, or its right-hand extreme position, as indicated by the two radial lines at 24, but is not removable when the locking barrel is in its left-hand extreme position.

The showing 12D illustrates such a switch wherein the key is removable when the locking barrel is in either its extreme left-hand position as indicated by the two radial lines at 25; or its extreme right-hand position, but is not removable when the locking barrel is in its intermediate position.

The showing 12E illustrates such a switch wherein the key is removable only when the locking barrel is in its intermediate rotary position, as indicated by the single radial line at 26 but is not removable when said locking barrel is in either its right-hand extreme position or its left-hand position.

The showing 12F illustrates such a switch wherein the key is removable only when the locking barrel is in its left-hand extreme position, as indicated by the single radial line at 27, but is not removable when said locking barrel is in either its intermediate position or its right-hand extreme position.

The showing 12G illustrates such a switch wherein the key is removable only when the locking barrel is in its right-hand extreme position, as indicated by the single radial line at 28, but is not removable when the locking barrel is in either its intermediate position or its left-hand extreme position.

Fig. 13 correspondingly illustrates seven possible arrangements of the various parts of three-position, key-operated, rotary selector switches, when mounted as shown in Fig. 10, for a minimum vertical space requirement of the flange portions 7ᵃ of a plurality of cast metal members 7 when mounted in a vertical row or rows. Like parts in each of the seven sub-figures A through G of Fig. 13 are designated by the same numeral of reference as the seven sub-figures A through G, respectively, of Fig. 12.

Referring again to Figs. 1 and 2, it will be noted that with one or more of the molded switch housings (shown at 1 in Fig. 2) attached to the lower surface of flange 7ᵃ of cast metal member 7, the assembled parts may be projecting outwardly through a substantially circular opening 37ᵃ, Fig. 2, in a panel 37 formed of metal or other suitable material, the aforementioned rubber or rubber-like sealing gasket 12 being seated within and projecting outwardly to some extent from the substantially circular recess 7ˣ in the upper surface of member 7; see also Fig. 10.

A suitable nameplate 38 (Figs. 1 and 2) having an opening of proper size and shape therein is then strung inwardly over the exposed portions of members 8 and 7 until it seats upon the outer surface of panel 37 (Fig. 2); whereupon a clamping ring or nut 29, having a serrated or roughened outer surface portion 29ᵃ, is threaded onto the peripherally threaded portion of member 7, thus securely clamping all of the attached parts to the panel 37; the ring 29 being drawn sufficiently tightly toward plate 38 and panel 37 to effect compression of gasket 12 to the necessary degree to insure against entrance of oil, or other liquid, from the outer surface of panel 37. Also as shown in Fig. 2 the opening 37ᵃ in panel 37 is provided with a notch 37ᵇ for cooperation the nib 7ʰ formed on member 7 to positively restrain the latter against rotary displacement relatively to panel 37.

As shown in Figs. 1 and 10, the threaded portion of member 7, onto which the ring 29 is threadedly attached, is provided a pair of straight-sided vertical grooves 7$^i$ and 7$^j$; the inwardly extending integral lug 38$^a$ on nameplate 38 fitting into groove 7$^i$, when the complete device is mounted as shown in Fig. 1, for a minimum vertical space requirement thereof; or said nameplate lug 38$^a$ may cooperatively fit into groove 7$^j$, when the assembly is mounted as shown in Fig. 10, for a minimum horizontal space requirement thereof.

In the modified forms of our invention illustrated in Figs. 14, 15, 16 and 17, most of the various parts are identical with those parts aforedescribed; and such like parts have corresponding reference numerals applied thereto in the several figures of the drawings. Thus in Fig. 14 the cast metal members 8 and 11 are of the same form as the corresponding parts aforedescribed; and the same is true of the locking barrel 13, although, of course, the spring-biased locking plungers 13$^x$ associated therewith will differ in a well known manner for proper cooperation with the particular cam formation on the key to be employed therewith.

The stop plate 14$^x$ illustrated in Fig. 14 is formed for attachment to the lower end of locking barrel 13 in the same manner as the plate 14 of Figs. 1 and 2; but, as shown in Fig. 14 plate 14$^x$ is additionally provided with an opening of the form and at the point shown at 14$^y$, to accommodate the reduced upper end or shank portion 30$^x$ of a pin 30, which upper end is upset or riveted, as shown at 30$^y$, to rigidly and permanently attach said parts to each other.

A shaft 31, having a reduced upper end portion 31$^a$ fitting closely within a central opening in the circular main body portion of stop plate 14$^x$, is welded, riveted or upset as shown in Fig. 14 to rigidly and non-rotatably connect shaft 31 and plate 14$^x$ to each other; whereupon plate 14$^x$ is rigidly and permanently attached to the lower end of the locking barrel in the same manner as illustrated in Fig. 5.

Shaft 31 is preferably of the same cross sectional form and size as the shaft 4 (Figs. 2 and 3); but is of greater length than shaft 4. Such greater length of shaft 31 is required because the lower cast metal member 32 employed in connection with the devices of Figs. 14 through 17 is of substantially greater height than the similar cast metal member 7, as shown in Figs. 2 and 3. Thus the upper end portion 32$^a$ of member 32 is of such greater height to provide the relatively deep, upwardly opening recess 32$^b$, which accommodates the pin 30 during movement thereof through an arc of approximately one hundred and twenty degrees; the cylindrical coiled compression spring 33; and the cylindrically wound coiled torsion spring 34—the upper and lower outwardly projecting end portions 34$^a$ and 34$^b$ of which normally engage opposite sides of an integral projection 32$^c$ from the bottom and side walls of said recess 32$^b$; said end portions 34$^a$ and 34$^b$ of said spring 34 likewise normally engaging opposite sides of pin 30.

Thus the key-operated rotary selector switch shown in Figs. 14 and 15 provides for spring return of all operating elements thereof to the normal or intermediate positions thereof, upon release of the key after manual operation of the latter in either rotary direction. For this reason, as illustrated in Fig. 14, the indexing elements 5 and 6, shown in Fig. 2, for example, may be omitted; it being understood that the cam member 3 may be like that shown in Figs. 2 and 3; or the indexing depressions in the upper surface thereof may be omitted; and said cam member is rigidly and non-rotatably attached to shaft 31 in the same manner as explained in describing the device of Figs. 2 and 3.

Fig. 16 illustrates a modification of the device illustrated in Figs. 14 and 15, to provide for automatic spring return of the various parts to their normal, or intermediate position after insertion of the proper key and rotation thereof in a clockwise direction, as indicated by arrow 35; whereas upon rotation of the key in a counterclockwise direction the spring 34$^d$ affords no resistance to rotary movement of shaft 31 or cam 3 (see Fig. 14) to its other circuit controlling position; there being no interference between arm 34$^c$ of spring 34$^d$ and abutment 32$^c$. For this reason a spring 5 (shown in dotted lines) like that illustrated in Figs. 2 and 3 is preferably employed, but with only one indexing button or projection 6 associated therewith, to insure retention of the parts in such other circuit controlling position, pending subsequent manual rotation of the key in a clockwise direction to return the cam to its intermediate or normal position. As aforestated, however, the barrel 13 can be locked in any of its respective locking positions by merely removing the key (such as 15) therefrom.

In the fragmentary illustration in Fig. 17, the coiled torsion spring 34$^e$ functions in a reverse manner from the arrangement shown in Fig. 16. That is to say, with an arrangement like that illustrated fragmentarily in Fig. 17, upon insertion of a key (15, see Fig. 3) and rotation of barrel 13 in a counterclockwise direction, as indicated by arrow 36, the short arm 34$^f$ of torsion spring 34$^e$ will be engaged by pin 30 and drawn in a counterclockwise direction to increase the tension of said spring; due to engagement of the long arm 34$^g$ of spring 34$^e$ with the adjacent side of the abutment 32$^c$ (see Fig. 16). Thus one or more circuits may be commutated by the switches subject to control by the cam, such as that shown at 3; but upon manual release of the key the various elements will be returned automatically to the positions to which they are normally biased.

We claim:

1. A key-operated rotary selector switch comprising a first cast metal member having an outwardly opening recess and an inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered double-hexagonal form in transverse cross section, a third cast metal member having a circular upper end portion adapted to seat within said second cast metal member in substantially flush relationship to the upper end of the latter, an intermediate portion of external hexagonal contour adapted to fit non-rotatably within said double-hexagonal recess in any one of twelve relative rotary positions selectively, a key-operated locking device telescoped into said third cast metal member and having a portion projecting inwardly beyond the latter and beyond the lower end portion of said second cast metal member, and a flat punched stop plate rigidly and permanently attached to the inner end of said locking device to retain the same and said second and third cast metal members in assembled relationship to each other.

2. A key-operated rotary selector switch comprising a first cast metal member having an outwardly opening recess and inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered double-hexagonal form in transverse cross section, a third cast metal member having a circular upper end portion adapted to seat within said second cast metal member in substantially flush relationship to the upper end of the latter, an intermediate portion of external hexagonal contour adapted to fit non-rotatably within said double-hexagonal recess in any one of twelve relative rotary positions selectively, a key-operated locking device telescoped into said third cast metal member and having a portion projecting inwardly beyond the latter and beyond the lower end portion of said second cast metal member, a flat punched stop plate rigidly and permanently attached to the inner end of said locking device to retain the same and said second and third cast metal members in assembled relationship to each other, and said third cast metal member having at least one pair of diametrically opposed inwardly opening slots formed therein at points spaced from the upper and lower ends of said member, any one of said slots being adapted to accommodate the spring-biased, outwardly projecting plungers of said locking device in the normal condition of the latter whereby the same is positively restrained against rotation relatively to said member last mentioned.

3. A key-operated rotary selector switch comprising a first cast metal member having an outwardly opening recess and an inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered double-hexagonal form in transverse cross section, a third cast metal member having a circular upper end portion adapted to seat within said second cast metal member in substantially flush relationship to the upper end of the latter, an intermediate portion of external hexagonal contour adapted to fit non-rotatably within said double-hexagonal recess in any one of twelve relative rotary positions selectively, a key-operated locking device telescoped into said third cast metal member and having a portion projecting inwardly beyond the latter and beyond the lower end portion of said second cast metal member, a flat punched stop plate rigidly and permanently attached to the inner end of said locking device to retain the same and said second and third cast metal members in assembled relationship to each other, and said third cast metal member having at least one pair of diametrically opposed inwardly opening slots formed therein at points spaced from the upper and lower ends of said member, any one of said slots being adapted to accommodate the spring-biased, outwardly projecting plungers of said locking device in the normal condition of the latter whereby the same is positively restrained against rotation relatively to said member last mentioned, and means comprising a flat metal stop plate rigidly and permanently attached to the inner end of said locking device, said plate having a lug extending laterally therefrom, and said second mentioned cast metal member having a pair of spaced lugs formed integrally therewith for cooperation with said lug to positively limit the degree of rotary movement of said stop plate and said locking device in each direction.

4. A key-operated rotary selector switch comprising a first cast metal member having an outwardly opening recess and an inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered double-hexagonal form in transverse cross section, a third cast metal member having a circular upper end portion adapted to seat within said second cast metal member in substantially flush relationship to the upper end of the latter, an intermediate portion of external hexagonal contour adapted to fit non-rotatably within said double-hexagonal recess in any one of twelve relative rotary positions selectively, a key-operated locking device telescoped into said third cast metal member and having a portion projecting inwardly beyond the latter and beyond the lower end portion of said second cast metal member, a flat punched stop plate rigidly and permanently attached to the inner end of said locking device to retain the same and said second and third cast metal members in assembled relationship to each other, and said third cast metal member having at least one pair of diametrically opposed inwardly opening slots formed therein at points spaced from the upper and lower ends of said member, any one of said slots being adapted to accommodate the spring-biased, outwardly projecting plungers of said locking device in the normal condition of the latter whereby the same is positively restrained against rotation relatively to said member last mentioned, means comprising a flat metal stop plate rigidly and permanently attached to the inner end of said locking device, said plate having a lug extending laterally therefrom, and said second mentioned cast metal member having a pair of spaced lugs formed integrally therewith for cooperation with said lug to positively limit the degree of rotary movement of said stop plate and said locking device in each direction, said stop plate having a metal shaft rigidly attached thereto and projecting inwardly through said opening in said first cast metal member, and a cam member of preselected form rigidly attached to the inner end of said shaft, for the purpose set forth.

5. A key-operated rotary selector switch comprising a first cast metal member having an outwardly opening recess and an inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered double-hexagonal form in transverse cross section, a third cast metal member having a circular upper end portion adapted to seat within said second cast metal member in substantially flush relationship to the upper end of the latter, an intermediate portion of external hexagonal contour adapted to fit non-rotatably within said double-hexagonal recess in any one of twelve relative rotary positions selectively, a key-operated locking device telescoped into said third cast metal member and saving a portion projecting inwardly beyond the latter and beyond the lower end portion of said second cast metal member, a flat punched stop plate rigidly and permanently attached to the inner end of said locking device to retain the same and said second and third cast metal members in assembled relationship to each other, and third cast metal member having at least one pair of diametrically opposed inwardly opening slots formed therein at points spaced from the upper and lower ends of said member, any one of said slots being adapted to accommodate the spring-biased, outwardly projecting plungers of said locking device in the normal condition of the latter whereby the same is positively restrained against rotation relatively to said member last mentioned, means comprising a flat metal stop plate rigidly and permanently attached to the inner end of said locking device, said plate having a lug extending laterally therefrom, and said second mentioned cast metal member having a pair of spaced lugs formed integrally therewith for cooperation with said lug positively limit the degree of rotary movement of said stop plate and said locking device in each direction, said stop plate having a metal shaft rigidly attached thereto and projecting inwardly through said opening in said first cast metal member, a molded insulating cam member rigidly attached to the inner end of said shaft, and a plurality of plunger-actuated type switch mechanisms attached to said first mentioned cast metal member for support thereby, and the plungers of said switch mechanisms being subject to control by said cam member either individually or jointly according to the particular form of the cam surfaces.

6. In a key-operated rotary selector switch operating mechanism, in combination, a first cast metal adapter member formed to provide for non-rotatable one-hole, oil-tight mounting thereof to a perforated panel or the like as by means of an internally threaded clamping nut, said adapter member having a substantially rectangular flange at the inner end thereof, one pair of parallel side edge portions of said flange being less widely spaced than the other pair thereof whereby said less widely spaced edges of a group of said flanges may be positioned adjacent each other for a minimum space requirement thereof when arranged in either vertical or horizontal rows, said cast metal adapter member having a pair of recesses formed therein respectively opening to the outer and inner ends thereof with an integral perforated wall therebetween, a second cast metal member having a reduced lower end portion closely fitted into said outwardly opening recess, a third cast metal member telescopically fitted into said second cast metal member in any one of a multiplicity of different relative rotary positions, for the purpose set forth, a substantially cylindrical locking barrel having a group of spring-biased plungers normally projecting laterally with respect thereto, said locking barrel being slidably insertable into said third cast metal member in any one of at least two rotary positions relatively thereto, said locking barrel being adapted upon insertion of the key associated therewith, for relatively free rotation within said third cast metal member, means including a flat metal stop plate rigidly attached to the inner end of said locking barrel to limit rotation thereof through an angle of one hundred and twenty degrees, said stop plate having a shaft rigidly attached thereto, and a switch operating cam member to which said shaft is rigidly attached for rotation of the former by the latter.

7. In a key-operated rotary selector switch operating mechanism, in combination, a first cast metal adapter member formed to provide for non-rotatable, one-hole oil-tight, mounting thereof to a perforated panel or the like as by means of an internally threaded clamping nut, said adapter member having a substantially rectangular flange at the inner end thereof, one pair of parallel side edge portions of said flange being less widely spaced than the other pair thereof whereby said less widely spaced edges of a group of said flanges may be positioned adjacent each other for a minimum space requirement thereof when arranged in either vertical or horizontal rows, said cast metal adapter member having a pair of recesses formed therein respectively opening to the outer and inner ends thereof with an integral perforated wall therebetween, a second cast metal member having a reduced lower end portion closely fitted into said outwardly opening recess, a third cast metal member telescopically fitted into said second cast metal member in any one of a multiplicity of different relative rotary positions, for the purpose set forth, a substantially cylindrical locking barrel having a group of spring-biased plungers normally projecting laterally with respect thereto, said locking barrel being slidably insertable into said third cast metal member in any of at least two rotary positions relatively thereto, said locking barrel being adapted upon insertion of the key associated therewith, for relatively free rotation within said third cast metal member, means including a flat metal stop plate rigidly attached to the inner end of said locking barrel to limit rotation thereof through an angle of one hundred and twenty degrees, said stop plate having a shaft rigidly attached thereto, a switch operating cam member to which said shaft is rigidly attached for rotation of the former by the latter, one or more plunger actuated switch mechanisms attached to and supported by said flange at the inner face of the latter, and said cam member when manually rotated through the medium of said lock barrel and said key affording control of the operation of said switch mechanisms.

8. In a key operated rotary selector switch, in combination, a locking barrel comprising a substantially cylindrical body portion having a multiplicity of plungers normally spring-biased outwardly therefrom at one side thereof, said locking barrel having an enlarged outer end, a cast metal member having a recess formed therein to freely accommodate said locking barrel with the respective outer ends of said parts in substantially flush relationship, said cast metal member having an opening in the lower end thereof through which the inner end of said locking barrel projects, a second cast metal member into which said first cast metal member is freely insertable in any preselected one of a multiplicity of different rotary positions, for the purpose set forth, a flat metal stop plate rigidly and permanently attached to the lower end portion of said locking barrel after such interfitting of said parts, to retain all of the same in properly assembled relation, a shaft rigidly attached to said stop plate, a cam member rigidly attached to the inner end of shaft for rotary movement with the latter through a predetermined range, and a plurality of plunger operated switch mechanisms subject to control by said cam.

9. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, and a flat metal stop plate rigidly attached to the inner end of said locking barrel and underlying a portion of the inner end of said second cast metal member, whereby all of said parts are retained in properly assembled relationship to each other.

10. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, a flat metal stop plate rigidly attached to the inner end of said locking barrel and underlying a portion of the inner end of said second cast metal member, whereby all of said parts are retained in properly assembled relationship to each other, said second cast metal member having a pair of spaced lugs formed integrally therewith at the inner end thereof, and said underlying portion of said stop plate also being in the form of a lug adapted for abutting engagement with one or the other of said first mentioned lugs, whereby said locking barrel is positively limited to rotary movement through an arc of approximately one hundred and twenty degrees.

11. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, a flat metal stop plate rigidly attached to the inner end of said locking barrel and underlying a portion of the inner end of said second cast metal member, whereby all of said parts are retained in properly assembled relationship to each other, said second cast metal member having a pair of spaced lugs formed integrally therewith at the inner end thereof, said underlying portion of said stop plate also being in the form of a lug adapted for abutting engagement with one or the other of said first mentioned lugs, whereby said locking barrel is positively limited to rotary movement through an arc of approximately one hundred and twenty degrees, said stop plate having a metal shaft rigidly attached thereto and extending inwardly therefrom, and a molded insulating cam member rigidly attached to the inner end of said shaft and movable therewith through said arc of one hundred and twenty degrees, for the purpose set forth.

12. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, a flat metal stop plate rigidly attached to the inner end of said locking barrel and underlying a portion of the inner end of said second cast metal member, whereby all of said parts are retained in properly assembled relationship to each other, said second cast metal member having a pair of spaced lugs formed integrally therewith at the inner end thereof, said underlying portion of said stop plate also being in the form of a lug adapted for abutting engagement with one or the other of said first mentioned lugs, whereby said locking barrel is positively limited to rotary movement through an arc of approximately one hundred and twenty degrees, said stop plate having a metal shaft rigidly attached thereto and extending inwardly therefrom, a molded insulating cam member rigidly attached to the inner end of said shaft and movable therewith through said arc of one hundred and twenty degrees, a third cast metal member to which said second cast metal member is rigidly attached, and said third cast metal member having an inner recess formed therein to provide for rotary movement of said cam through said arc of one hundred and twenty degrees as an incident to corresponding movement of said locking barrel upon insertion into the latter and rotation of the operating key.

13. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, a flat metal stop plate rigidly attached to the inner end of said locking barrel and underlying a portion of the inner end of said second cast metal member, whereby all of said parts are retained in properly assembled relationship to each other, said second cast metal member having a pair of spaced lugs formed integrally therewith at the inner end thereof, said underlying portion of said stop plate also being in the form of a lug adapted for abutting engagement with one or the other of said first mentioned lugs, whereby said locking barrel is positively limited to rotary movement through an arc of approximately one hundred and twenty degrees, said stop plate having a metal shaft rigidly attached thereto and extending inwardly therefrom, a molded insulating cam member rigidly attached in the inner end of said shaft and movable therewith through said arc of one hundred and twenty degrees, a third cast metal member to which said second cast metal member is rigidly attached, said third cast metal member having an inner recess formed therein to provide for rotary movement of said cam through said arc of one hundred and twenty degrees as an incident to corresponding movement of said locking barrel upon insertion into the latter and rotation of the operating key, said third cast metal member having a recess formed in the upper end thereof, said stop plate having a metal pin rigidly attached thereto and projecting into said recess, and a coiled torsion spring located within said recess, said spring having straight portions projecting from the upper and lower ends thereof and respectively engaging opposite sides of said pin, and one or the other or both of said straight end portions of said torsion spring being of sufficient length to also engage an abutment formed on the wall of said last mentioned recess, whereby said cam is automatically returned to its normal biased position upon release of the key after manual rotation thereof in a given direction.

14. In a key-operated rotary selector type switch, in combination, a tumbler type lock including a rotatable locking barrel, a cast metal member formed to provide a bearing for said locking barrel, a second cast metal member within which said first cast metal member is adapted to seat in any one of a multiplicity of rotary relationships one to the other, a flat metal stop plate rigidly attached to the inner end of said locking barrel and underlying a portion of the inner end of said second cast metal member, whereby all of said parts are retained in properly assembled relationship to each other, said second cast metal member having a pair of spaced lugs formed integrally therewith at the inner end thereof, and said underlying portion of said stop plate also being in the form of a lug adapted for abutting engagement with one or the other of said first mentioned lugs, whereby said locking barrel is positively limited to rotary movement through an arc of sixty, ninety or one hundred and twenty degrees.

15. A key-operated rotary selector switch comprising a first cast metal member having an outwardly opening recess and an inwardly opening recess, said member having an integral wall defining the inner ends of the respective recesses, said wall having a central opening therethrough, a second cast metal member of substantially tubular form having a reduced lower portion adapted to fit closely within the periphery of said outwardly opening recess, said second cast metal member having a recess therein of downwardly tapered, multi-positioning form in transverse cross section, a third cast metal member having a circular upper end portion adapted to seat within said recess in said second cast metal member in any one of a plurality of relatively rotary positions selectively, for the purpose set forth, a key-operated locking device telescoped into said third cast metal member and having a portion projecting inwardly beyond the latter and beyond the lower end portion of said second cast metal member, and a flat punched metal stop plate rigidly and permanently attached to the inner end of said locking device to retain the same and said second and third cast metal members in assembled relationship to each other.

16. A key-operated rotary selector switch of the character defined by claim 15, wherein said third cast metal member has at least one pair of opposed recesses formed in the peripheral wall of the aforementioned recess therein, for the purpose set forth.

No references cited.